United States Patent
Sergeev

(10) Patent No.: US 8,711,870 B2
(45) Date of Patent: Apr. 29, 2014

(54) TECHNOLOGY FOR MANAGING TRAFFIC VIA DUAL HOMED CONNECTIONS IN COMMUNICATION NETWORKS

(75) Inventor: Andrew Sergeev, Kfar-Sava (IL)

(73) Assignee: ECI Telecom Ltd., Petach-Tikva (IL)

( * ) Notice: Subject to any disclaimer, the term of this patent is extended or adjusted under 35 U.S.C. 154(b) by 300 days.

(21) Appl. No.: 13/287,750

(22) Filed: Nov. 2, 2011

(65) Prior Publication Data

US 2012/0120850 A1 May 17, 2012

(30) Foreign Application Priority Data

Nov. 11, 2010 (IL) .......................................... 209250

(51) Int. Cl.
*H04L 12/28* (2006.01)
(52) U.S. Cl.
USPC ............ 370/401; 370/392; 370/216; 370/255
(58) Field of Classification Search
None
See application file for complete search history.

(56) References Cited

U.S. PATENT DOCUMENTS

| | | | |
|---|---|---|---|
| 2009/0122800 A1* | 5/2009 | Umayabashi et al. | ... 370/395.31 |
| 2009/0168647 A1 | 7/2009 | Holness et al. | |
| 2010/0287405 A1* | 11/2010 | Soon | ................................. 714/4 |
| 2010/0325272 A1* | 12/2010 | Lloyd et al. | ................... 709/224 |
| 2012/0106318 A1* | 5/2012 | Gu et al. | ....................... 370/216 |

FOREIGN PATENT DOCUMENTS

CN 101330424 12/2008

OTHER PUBLICATIONS

Y. L. Jiang, Flushing-free MAC address Operation in VPLS with Redundancy, working document, Jul. 3, 2009, 12 pages, IETF Internet draft.

* cited by examiner

*Primary Examiner* — Duc C Ho
(74) *Attorney, Agent, or Firm* — Abe Hershkovitz; Hershkovitz & Associates, PLLC

(57) ABSTRACT

Technique for handling traffic between a specific common source node and a network element NE being part of a dual homing configuration, via a main path and an auxiliary path in the configuration, the technique comprises redirection of the traffic from one of said paths to another while the path from which the traffic has been redirected remains active, while relearn of MAC addresses which is required due to the redirection is performed without executing a MAC addresses flush operation.

4 Claims, 1 Drawing Sheet

TECHNOLOGY FOR MANAGING TRAFFIC VIA DUAL HOMED CONNECTIONS IN COMMUNICATION NETWORKS

CROSS-REFERENCE TO RELATED APPLICATIONS

This application claims priority of Israel Patent Application No. 209250, filed Nov. 11, 2010 the disclosure of which is incorporated by reference herein in its entirety.

FIELD OF THE INVENTION

The present invention relates to a technique for managing dual homed configurations in communication networks, more specifically—to a technique of handling faults in operation of the dual horned configurations, preferably in MPLS networks.

BACKGROUND OF THE INVENTION

In the prior art, faults in dual homed configurations of nodes in communication networks are usually overcome by changing a path in the configuration, accompanied by flushing address tables in the nodes. Let us discuss a configuration shown in FIG. 1, where two peer nodes of a dual homed configuration residing in a first network (say, gateways A, B of an aggregation network or a transport network)—are connected to one common node F—let it be called a source node. In the dual homed configuration, the two gateways A, B are respectively connected to two nodes C, D of a second network (say, of an access network). Such a configuration may serve for unilateral protection (or Y-projection) of a specific node—say, node C in the second network, which is adapted to receive traffic from any of the gateways A, B. In case a fault occurs in one of the gateways of such a configuration (say, in the main/primary node A being currently in communication with the common source node F), the dual homed structure must react to the change of status of the gateways as follows: the traffic must be established via another (secondary) node B of the configuration, and to do so a so-called MAC flush operation must be performed in the source node F ("z" marks a MAC table of e node F).

The problem of changing status of the peer nodes is often in synchronizing the further operation of the nodes. For example, the problem becomes actual in case when the dual homed configuration returns to normal upon some fault of the primary gateway has been fixed. In that case, communication from the common source node F should be rerouted back (to pass via the primary gateway again), and it means that the flush operation in the node F has just been performed due to the fault, seems to become necessary again. Such a flush operation is indeed performed in all prior art solutions. Usually, OAM signaling messages are utilized for such purposes. However, those skilled in the art know that any MAC flush operation not only consumes time and resources of the system, but also leads to missing some data due to the rerouting. The effect of missing data is sometimes called "black holing" and takes place, for example, before and during the flushing of MAC addresses due to change of status of the dual homing nodes and paths.

Various prior art solutions are known in the field, for example:

US2009168647A describes inter-working an Ethernet Ring network with an Ethernet network with traffic engineered trunks (PBT network) and enables traffic engineered trunks to be dual homed to the Ethernet ring network to allow protection switching between active and backup trunk paths in the PBT network. In one embodiment, the active path will terminate at a first bridge node on the Ethernet ring network and the backup path will terminate at a second bridge node on the Ethernet ring network. Trunk state information is exchanged between the bridge nodes to enable the bridge nodes to determine which of the active and backup paths should be used to forward data on the trunk. Upon a change in trunk state, a flush message is transmitted on the Ethernet ring network to enable the nodes on the Ethernet ring network to relearn the path to the new responsible bridge node.

CN101330424A discloses a method for handling a service failure of a virtual private network and relates to the technical field of network communications. The method comprises the following steps: a second provider edge device (PE) sends a Hush message to a switch when a failure occurs between a first client edge (CE) device and a second CE device, wherein the second PE device turns into a forwarding state; eliminating a medium access control (MAC) address list of the switch according to the Flush message; eliminating a MAC address list of a third PE device. The invention further discloses a VPN failure handling system, which comprises the switch, a first PE device, the second PE device and the third PE device. The method solves the problem that a CE dual-homing network switch interface of a virtual private LAN service (VPLS) network can not update in time, so as to improve the reliability of the VPLS network.

Internet Draft "Flushing-free MAC address Operation in VPLS with Redundancy" (draft-jiang-12vpn-vpls-mac-operation-ol.txt) by Y. L. Jiang et al, describes a case when that Peer Elements PE1 and PE2 of a dual homing configuration may switch some forwarding items affected by a topology change, rather then flushing them (i.e., to perform so-called MAC address moving). For example, PE may actively switch the MAC addresses in its MAC address table which are associated with the failed access link. After detection of the failure of the primary access link, PE1 sends out a "MAC address switching" message to all its peers in the VPLS, with addresses of PE1 and PE2 in the message and with a MAC list of the MAC addresses associated with the access link to be switched, or with a null MAC list when all access links attached to PE1 in the same VPLS are to be switched. PE1 can actively switch the MAC addresses in its MAC table, which are associated with the failed access link.

In any of the above-mentioned documents the operation of switching from one peer (GW) of the dual homed structure to another (including the case of returning to the primary peer) is accompanied either with the flushing, or with the MAC switching (performed by signaling), both of which comprise complex and traffic-affecting actions.

OBJECT AND SUMMARY OF THE INVENTION

It is therefore the object of the present invention to propose a simple and traffic-non affecting solution for handling cases of rerouting traffic in dual homing (or dual homed) configurations of communication networks.

The Inventor has noticed that a. so-called "black holing" ("blackholing") phenomenon occurs upon changes of topology due to switching between peers/gateways of a dual horning connection/configuration, and usually exists all the time while a MAC flush request is propagated over the network and while the MAC flush is performed. Further, the Inventor has noticed that there are some cases when the switching between the peers takes place while both of the peers and their associated paths are in order ("ON", active). Such switching may take place, for example, when one of the peers/a path associated with the peer has been fixed after its failure;

another example may be when the switching between the peers is just initiated by an operator (say, due to considerations of load balance). Other examples may exist as well.

Let us consider that we have a dual homing configuration connecting two networks, the dual homing configuration comprises two peers (Gateway nodes or GW) in a first network such as a transport or aggregate network, and also comprises at least one network element/node NE in a second network such as an access network.

Let the two GWs are connected to at least one common source node in the first network, two paths respectively passing through the two GWs are formed between the source node and one said NE, and among the two paths (during operation) one path is a currently main path and the remaining path is a currently auxiliary path for any specific traffic service.

The above object can be achieved by a method of handling traffic between a specific common source node and said one network element NE via the dual homing configuration using the mentioned two paths; the method comprises redirecting the traffic from one of said paths to another while the path from which the traffic has been redirected remains active (i.e., in order, "ON"); wherein the method being characterized in performing relearn of MAC addresses (required due to the redirection) regardless/independently from/without executing a MAC addresses flush operation.

It should be emphasized that contrary to all prior art technologies, the proposed technique does not need, and in the version described below does not perform the MAC flush operation in the source node(s) connected to the peers/gateways (GWs). In prior art methods, an access network element/node (NE), upon changes in the dual homing topology, usually asks for flushing by sending its specific MAC withdraw message towards the common source node F. The proposed method does not need such flushing and such messages. The NE of interest is informed by an operator, NMS or EMS about changes in the topology, and "knows" which path is now considered main and which auxiliary; however the NE does not bother sending any messages toward the source node. GWs' address tables also remain without flushing in the proposed method, while many prior art methods recommend flushing MAC addresses also in the GWs.

The first and the second networks are preferably both MPLS networks, and both of said paths are preferably pseudo wires (PWs) serving for carrying one or more traffic services between the source node and the NE.

A traffic service should be understood as a data flow (with one or more types of data such as voice, video, etc.) in one or more VPLS domains, determined by a specific connectivity between end points of the flow. It may be a point-to-point, a multipoint-to-point (say, between a number of source points and one NE), a multipoint-to-multipoint traffic service, etc.

At the time of redirecting the traffic from one path to another, both of the paths may be "ON" at least due to case "a" or case "b", said cases being:
a) automatically reverting the traffic temporarily passing via one of the paths (due to failure of the other path which was the main/preferred path),—to that other (main/preferred) path if it has already been fixed;
b) deliberately redirecting the traffic from one of the paths to the other or vice versa, say upon an operator's request.
More specifically, the method may comprise:
issuing either an automatic logical decision at the NE to reroute the traffic, or an outside command causing the NE to reroute the traffic;
considering the path to which the traffic is being rerouted as a currently main/preferred path, and the path from which the traffic is being rerouted as a currently auxiliary path;

allowing a MAC address table in the Source node to be relearned gradually, (without performing flushing of the address table in the source node), while marking, at each of the GW nodes, at least so-called "known traffic"; at each of the GW nodes, sending all traffic that arrives from the Source node, to the communication network (i.e., sending to the NE via both of the paths any traffic (which may be broadcast, multicast or unicast traffic.);

at the network node (NE) in the access communication network, accepting from the path being currently auxiliary only the marked traffic, while accepting all traffic from the currently main path.

It should be noted that the GW may mark, by suitable marking, any type of traffic, but any way it would be for distinguishing the "known traffic" from any other type of traffic. The "known traffic" should be understood as unicast traffic received from a Source node and addressed to specific addresses in the communication network which are known to the address table of that GW (i.e., traffic being not multicast/broadcast/flooded and being previously learned by that GW).

The main purpose of the method is to allow the "known traffic" to be anyway still received at the NE, via any of the paths, so that to avoid the blackholing which happens when the conventional flushing is performed. The proposed process will be further explained below.

The proposed arrangement allows so-called "soft redirection" of traffic, which was formerly carried via a formerly main path,—to start being carried via a formerly auxiliary path which starts becoming the main—and that without excessive flushing of the address table in the source node. This scenario covers both of the above-mentioned cases "a" and "b". Due to the proposed technique, it may happen that specific nodes in the second/access network (NEs of the dual homed configuration) will receive some traffic twice—both from the main path and from the auxiliary path. However, as mentioned above, such nodes (NEs belonging to the dual homed configuration) will be adapted to accept only the marked traffic ("known") from the auxiliary path, and reject any other traffic received there-from. With time, addresses which are not updated in the address tables of the source node (and of the gateways) will become "aged" and die themselves, so that even the specific traffic will be directed only and always via the currently main/preferred path.

The proposed technique does not require any protocol and any synchronization between gateways and dual-homed node NE, as well as between GWs and the Source node.

The technique of marking can be performed by any method which seems adequate to a person skilled in the art, for example by per-packet in-band information. For instance, the in-band indication may be performed by marking "1" in a service bit/byte reserved for a. future use in a traffic packet. Preferably, we may use an MPLS PW control word field, for example for marking the "known" traffic.

The communication networks may comprise MPLS networks, PBB/PBT networks and even (possibly) a standard Ethernet network.

Actually, any gateway/peer of the dual homed configuration may be adapted to perform the new operation of marking the "known" traffic; accordingly, node(s) NE of the second communication network (i.e. NE(s) being part of the discussed dual-homed configuration) may be adapted to recognize the marked traffic and then to make a decision whether to accept traffic other than the marked one, depending on status of the dual homed gateway/peer/path from which such traffic is received. Namely, if the status of the sending gateway is "primary" (i.e., being part of the main path), all traffic therefrom should be accepted; if the status of the sending gateway is "secondary" (i.e., it is part of the auxiliary path), only the marked traffic there-from should be accepted.

Thus, the dedicated packets from so-called "old addresses" will continue arriving and be accepted by the destination node, till the time they will stop arriving themselves—due to full relearning of the "new addresses" by the source node's MAC address table.

There is also provided a new software product (program product) which, for example, may reside in a network processor based Carrier Ethernet Switch for implementing the proposed technique. The software product can be implemented as FPGA, CPU within a node of the dual homed configuration, and preferably would comprise all (but selectable) of the mentioned functions/ sub-programs, according to the node's kind and status.

The software product comprises computer implementable instructions and/or data for carrying out the method described in this description, stored on an appropriate computer readable storage medium so that the software is capable of enabling operations of said method when used in a computerized system associated with a dual homed structure in a communication network.

A portion of the program product (its controlling, or configuring part) may reside in a Network Management System NMS NMS since NMS "knows" the given network topology, in our case—dual-homed gateways and nodes. However, the dual homed structure can be configured and controlled via Element Management System EMS or a Command-Line Interface (CLI) as well.

Still further, there is proposed a network node intended to serve part of a dual homed configuration and adapted to behave according to the proposed technique either as a GW or as a NE, by marking the traffic (the GW function) or by selectively accepting traffic from different dual homed gateways/paths (the NE function). In principle, the inventive node may behave both as a GW and as a NE if it is positioned between three networks and serves as a GW in one dual homed structure (the structure connecting a first and a second networks), while simultaneously serves as a NE in another dual homed structure (connecting the second and a third network).

BRIEF DESCRIPTION OF THE DRAWINGS

The invention will be further described with reference to the following non-limiting examples, in which.

DETAILED DESCRIPTION OF THE PREFERRED EMBODIMENTS

Figure 1:
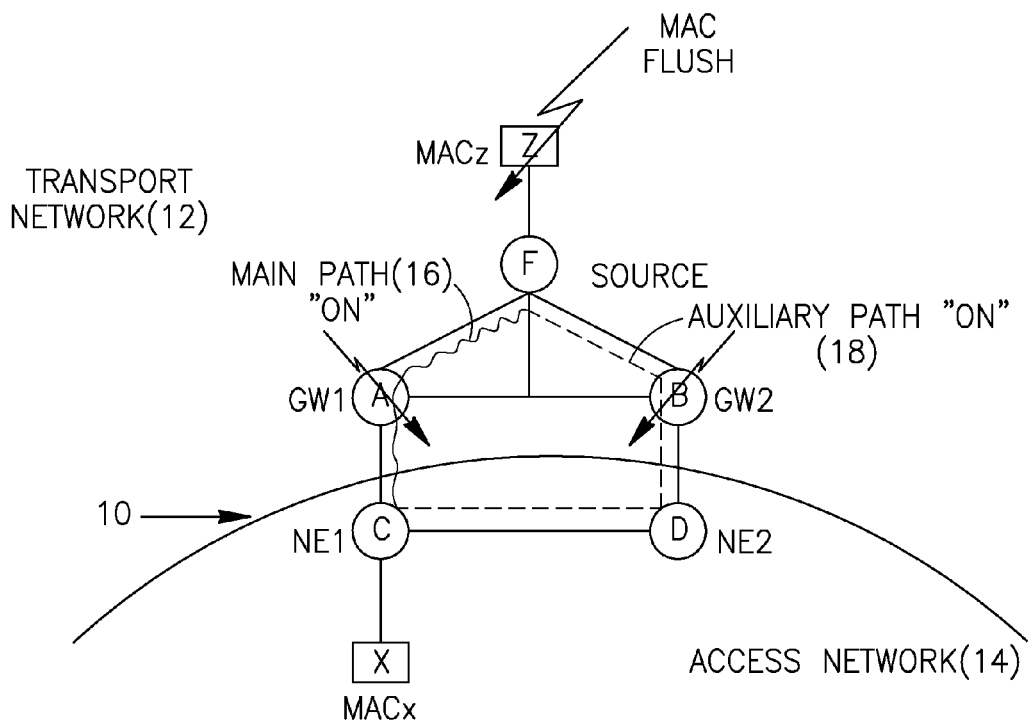
FIG. 1 (prior art) illustrates how dual-homed gateways usually operate in case of unilateral protection for a specific node located in a communication network.

FIG. 1 illustrates a dual-homing configuration 10 (A-B-C-D) via which a Source node F of a transport network 12 communicates with a network element NE1 (C) of an access network 14. Let traffic of a specific communication service is currently carried along a main path (a waved line 16) passing via node A (Gateway GW1) which is currently the primary/main gateway of the configuration 10. An auxiliary path (a dashed line 18) crossing node B (gateway GW2) serves for protection and load balancing of the main path. Let a Network Management System NMS (not shown) has issued an order to perform a load balancing operation and to shift the communication service, which formerly used path 16, to path 18.

In the prior art solutions, MAC address table "z" of the Source node F and often of the gateways A,B) is flushed (symbolically marked by arrows in the drawing) to relearn new addresses (from node B) for the discussed service. Due to such an operation, some packets of the traffic service will definitely be lost while the MAC address table "z" learns new address for the service of interest. Depending on specific implementation, the MAC flush operation may be service-dependent, or may be total (i.e., flushing the whole table each time any traffic service needs relearning of MAC addresses).

Figure 2:
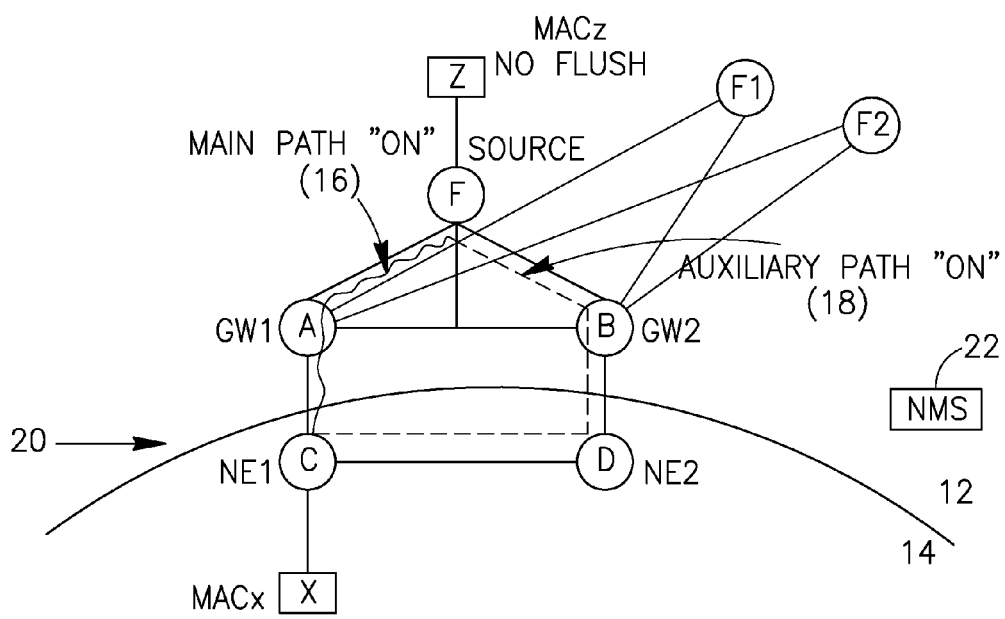
FIGS. 2 shows an example of the proposed technique utilized in the dual homed configuration, for example for optical networks.

FIG. 2 illustrates a similar dual homing configuration 20, but the nodes thereof (A, B, C, D) and the network management system NMS 22 are provided with the proposed new program product which ensures a new behavior of the Gateways GW1, GW2 and nodes NE1 NE2 of the configuration 20, Instead of NMS 22, EMS systems (not shown) of the nodes may perform control and configuring functions. The dual homing configuration 20 may serve for carrying various traffic services, for example an end-to-end traffic service between NE1 and a common source node F. However, there may be a multipoint-to-point traffic service between a number of source nodes F, F1, F2 and one of the network elements (say, the same NE1). Actually, for services between the NE1 and any of the sources F, F1, F2 the dual horning configuration 20 may be considered to comprise three nodes—A, B and C. Connection between C and B may be either direct, or via transparent node D. Analogously, if services are carried between NE2 and a common source node in the second network, the dual homing configuration may be considered to comprise nodes A, B and D.

Let traffic of the end-to end communication service from Source node F to NE1 must be shifted from one path to another. Say, the traffic should be returned to path 16 which again becomes main (the waved line), from path 18 which now becomes auxiliary (the dashed line), while both of the paths are active, i.e., are simultaneously "ON" at the moment. We keep in mind that the destination node NE1 is informed (say by NMS 22) that the main path is now path 16. Instead of flushing the MAC addresses table "z" of the Source node F, the Inventors propose leaving it as is and let it to keep sending the packets as before, via the GW2 (secondary node B in the auxiliary path), until the table is relearned according to packets received from NE1 via the newly stated main path 16. With time, the table "z" will fully relearn that the specific traffic should be rerouted via node A (GW1, primary node, main path). Meanwhile, according to the invention, any one of the gateways—node A and node B—will mark the unicast traffic packets having addresses in the network 14 which are known to that specific node A(B), as "known traffic". Actually, it would be sufficient if performed only by the node that has become the secondary node (node B in this example), but the gateways are usually not informed about their status, while NEs are. The marking can be done by inserting a predetermined sign in a specified byte in the packet. According to the invention, such packets will be received and accepted at the destination node of the dual homing configuration (in this case, at node NE1) from any of the paths. Other packets (multicast, broadcast, flooded, unicast having addresses unknown to the GW) will be accepted at NE1 only from the main path 16 since all packets from the main path should be accepted at node NE1. In this, manner, all broadcast and the like packets coming from path 18 will be discarded at node NE1. As a result, node NE1 will be secured from missing important packets of traffic, even if they arrive from "the old route".

It should be appreciated that other versions and embodiments of the new technique could be proposed and should be considered part of the invention whenever defined by the claims which follow.

The invention claimed is:

1. A method of handling traffic via a dual homing configuration connecting two communication networks, wherein the dual homing configuration comprises two peers GWs in a first network and at least one network element NE in a second network, the two GWs being connected to one or more common Source nodes, two paths, respectively passing through the two GWs being formed between a specific source node and said at least one NE, and among the two paths, during operation, one path is a currently main path and the remaining path is a currently auxiliary path for a specific traffic service method comprising:
    transmitting said specific traffic service between the specific common Source node and said at least one NE via the dual homing configuration;
    redirecting the specific traffic service from one of said paths to another while both of said paths are active; and
    relearning MAC addresses, due to said redirecting, without executing a MAC addresses flush operation in said specific Source node.

2. The method according to claim 1, wherein the first and the second networks are MPLS networks, both of said paths are pseudo wires PWs serving one or more traffic services between the specific Source node and said at least one NE.

3. The method according to claim 1, further comprising:
    issuing one of, an automatic logical decision at said at least one NE to redirect the traffic, or an outside command causing said at least one NE to redirect the traffic;
    considering the path to which the traffic is redirected as a currently main path, and the path from which the traffic is redirected as a currently auxiliary path;
    while marking, at each of the GW nodes, at least known traffic being packets of said specific traffic service, having known destination addresses and being neither broadcast, nor multicast;
    at said at least one NE, accepting from the path being currently auxiliary only the marked traffic, while accepting any traffic from the currently main path.

4. A non-transitory computer readable storage medium storing instructions and/or data for carrying out the method of claim 1, the instructions being capable of enabling operations of said method when used in a computerized system.

* * * * *